INVENTORS
RALPH L. JAESCHKE
BY HOWARD E. WILTSEY
Williams, David,
Hoffmann & Yount
ATTORNEYS

INVENTORS
RALPH L. JAESCHKE
BY HOWARD E. WILTSEY
ATTORNEYS

Dec. 7, 1965  R. L. JAESCHKE ETAL  3,221,854
COUPLING DEVICE FOR CLUTCH OR BRAKE USE
Filed May 14, 1962  5 Sheets-Sheet 5

INVENTORS
RALPH L. JAESCHKE
BY HOWARD E. WILTSEY
Williams, David,
Hoffmann & Yount
ATTORNEYS United States Patent Office 3,221,854
Patented Dec. 7, 1965

3,221,854
COUPLING DEVICE FOR CLUTCH OR BRAKE USE
Ralph L. Jaeschke, Kenosha, and Howard E. Wiltsey, Racine, Wis., assignors to Eaton Manufacturing Company, Cleveland, Ohio, a corporation of Ohio
Filed May 14, 1962, Ser. No. 194,313
13 Claims. (Cl. 192—84)

This invention relates to coupling devices of the kind applicable to clutch or brake use and, as one of its objects, aims to provide a novel coupling device of this type having simple, practical and efficient means for maintaining or re-establishing an intervening air gap of a desired normal width between a pair of cooperating relatively rotatable coupling members.

Another object is to provide a novel coupling device having an air gap adjusting means comprising a ring member mounted on a rotatable support means by a gripping engagement therewith and having a portion projecting into an internal annular recess of a coupling member axially shiftable on the support means, and spring means in the recess and subject to loading between the projecting ring portion and one of the end walls of the recess.

Still another object is to provide a novel coupling device having air gap control and adjusting means comprising a ring member mounted on a rotatable support means by an axially adjustable gripping engagement therewith and disposed in an inclined relation to wall means of an axially shiftable coupling member so as to define with said wall means a divergent annular crevice, and spring means in such crevice and effective to cause shifting of said coupling member in an uncoupling direction and also a gap-adjusting axial shifting of said ring member in the opposite direction.

A further object is to provide a novel electromagnetic coupling device applicable to clutch or brake use and having coupling members comprising a pole means and an associated axially shiftable armature means mounted on a rotatable support means, and an air gap adjusting means comprising a ring member mounted on said support means as referred to above.

As still another object thereof, this invention provides novel coupling means of the character above indicated and embodying one or more of the characteristics: that the gap adjusting means comprises a plurality of ring members and associated spring means, that a second one of the ring members is mounted on the shiftable coupling member, that the spring means is carried by one of the ring members, that the spring means comprises flexible portions projecting from one of the ring members into the divergent crevice, that the spring means is effective to urge the shiftable coupling member to an uncoupled position and one of the ring members comprises abutment means for limiting the movement of the shiftable coupling member in the uncoupling direction, that the ring member mounted on the support means has serrated gripping means in gripping engagement therewith and is adjustably slidable therealong for controlling air-gap width, that the ring member mounted on the shiftable coupling member is a spring ring having a flexed condition for self-locking engagement thereof with the shiftable coupling member, that the spring means comprises segments spaced apart circumferentially around the gap adjusting means, that the spring means comprises circumferentially extending and circumferentially spaced fingers on one of the ring members, that the ring member mounted on the shiftable coupling member is of the snap-ring type and has a helical shape, and that the spring means can be carried by a third ring member.

Additionally this invention provides a novel coupling device having gap adjusting means of the character above referred to and wherein the axially shiftable coupling member is actuatable by fluid pressure responsive means.

Other objects, novel characteristics and advantages of this invention will be apparent in the following detailed description and in the accompanying drawings forming a part of this specification and in which, FIG. 1 is an axial section taken through a coupling device embodying the present invention and showing the shiftable coupling member in its uncoupled or open position;

FIG. 3 is a fragmentary sectional view corresponding with a portion of the view of FIG. 1 but on a larger scale for clearer illustration of the gap adjusting means;

FIG. 4 is a fragmentary sectional view similar to that of FIG. 3 but showing the condition and relative position of the gap adjusting means when the shiftable coupling member is in its coupled or closed position;

As has been indicated above in a general way, this invention provides a novel coupling device applicable to either clutch or brake use and embodying gap adjusting means for automatically maintaining, or re-establishing, an intervening air gap of a desired normal width between a rotatable and axially shiftable coupling member and its associated coupling member. An electromagnetic coupling device 10 is shown in FIGS. 1 to 7 of the drawings as illustrative of one embodiment of the invention and will be described first.

Figure 1:
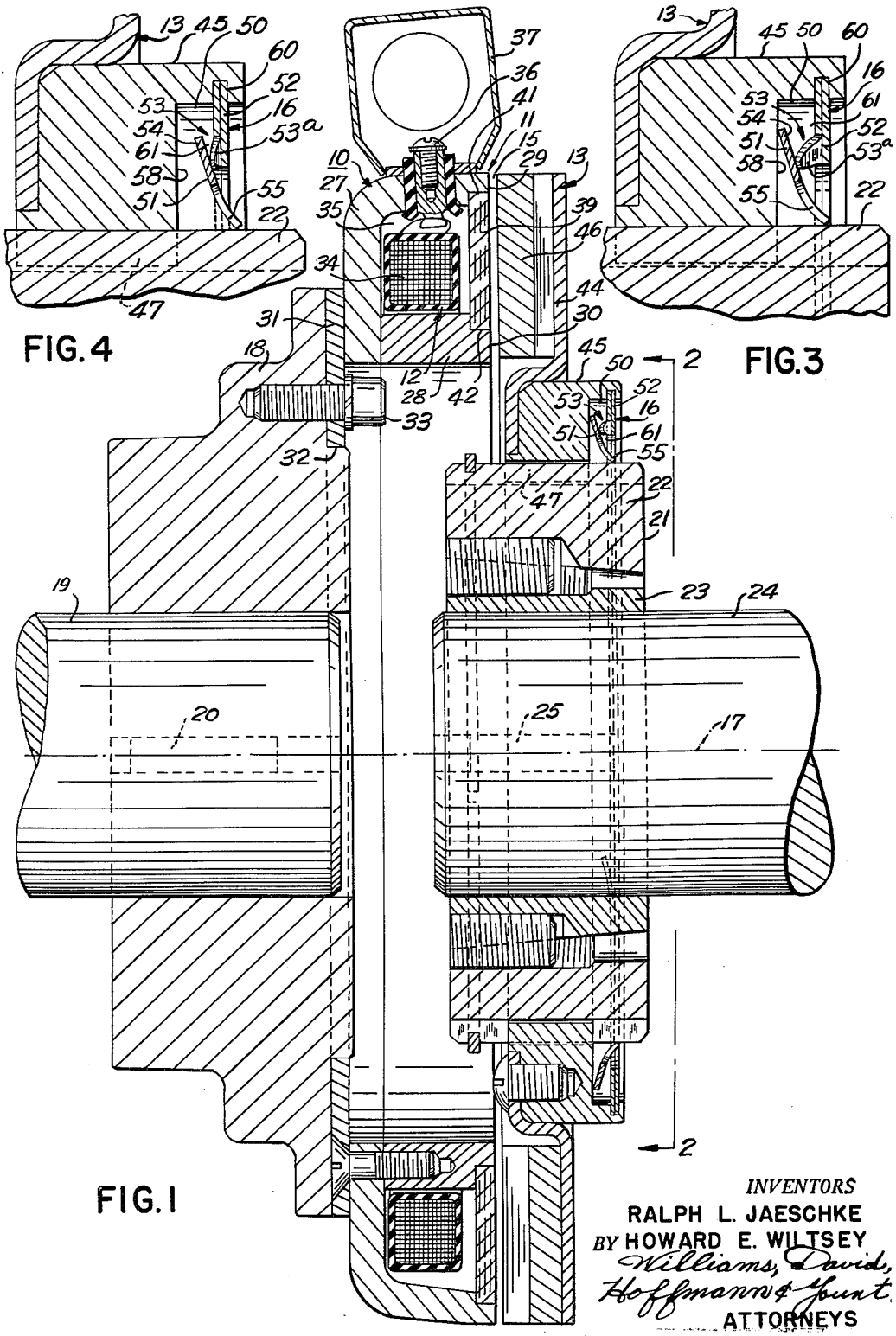
Figure 2:
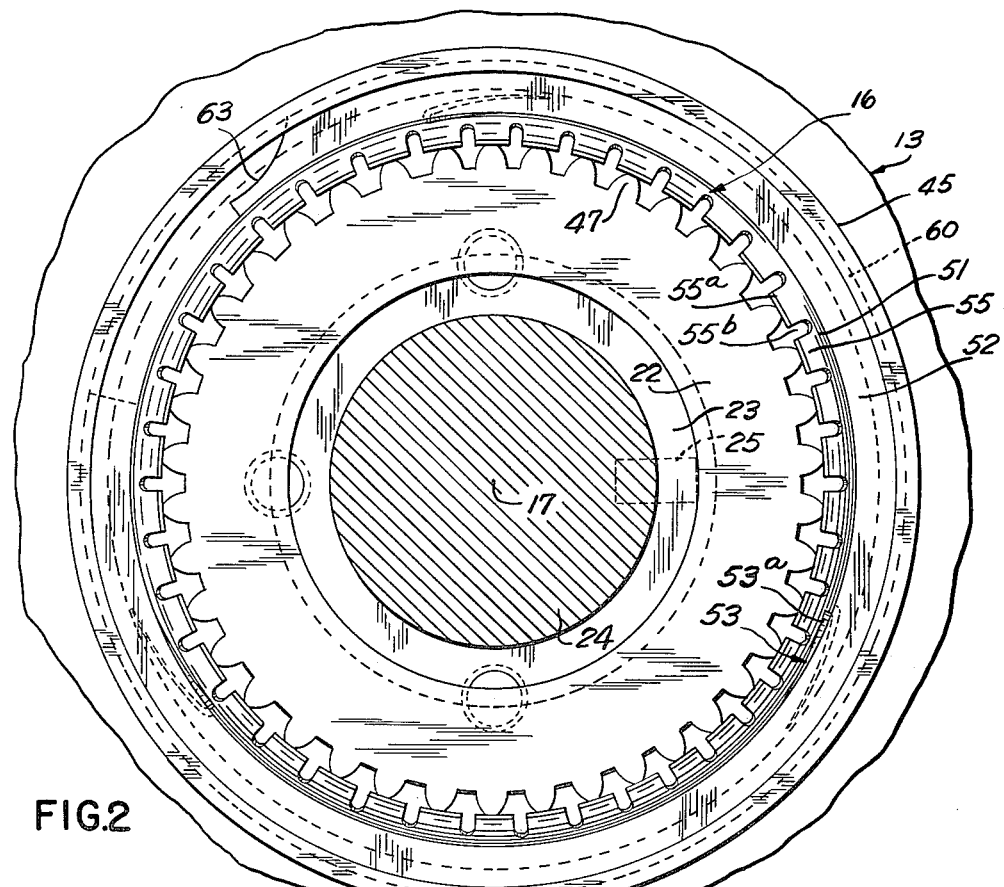
FIG. 2 is a partial transverse section taken on section line 2—2 of FIG. 1.

The coupling device 10 comprises, in general, a first coupling member shown in the form of an annular pole means 11, an energizing coil means 12 associated with the pole means, and a rotatable and axially shiftable second coupling member shown in the form of an annular armature means 13. In its uncoupled or open position, the armature means 13 is spaced from the pole means 11 by an intervening annular air gap 15 as shown in FIG. 1. The coupling device 10 also comprises, as an important part thereof, a gap adjusting means 16 to be described in detail hereinafter.

The pole means 11 and the armature means 13 comprise torque members in the sense that driving or holding torque is transmitted therebetween when these members are in their closed or coupled relation, the torque being driving torque when the coupling device 10 is being used as a clutch and holding torque when the coupling device 10 is being used as a brake. The coupling members 11 and 13 are shown as having a common axis 17 which is the rotation axis of the armature means. During the brake use of the coupling device 10 the pole means 11 is stationary, that is, nonrotatable but during the clutch use of the coupling device the pole means is rotatable on the common axis 17. The pole means 11 is mounted on a carrier, in this case, on a hub member 18 secured on a shaft 19 as by means of a suitable key 20.

The armature means 13 is supported in an axially adjacent relation to the pole means 11 so as to be rotatable relative thereto when the coil means 12 is de-energized, and to also be axially shiftable to its coupled and uncoupled positions relative to the pole means. For this purpose the armature means 13 is mounted on a rotatable armature support means 21 which is here shown as comprising a hub member 22 suitably secured on a collar 23, the latter being attached to a rotatable shaft 24 as by means of a key 25. When the coupling device 10 is being used as a clutch, either of the shafts 19 and 24 can be the power input shaft.

The pole means 11 is of a conventional construction comprising a pair of connected pole ring members 27 and 28 of a suitable shape and arranged to provide a pair of radially spaced annular pole faces 29 and 30 presented toward the armature means 13. The pole means 11 is mounted on the hub member 18 of the shaft 19 as by means of an attaching ring or flange 31 extending inwardly from the pole ring 27 and having its inner periphery seated on an annular shoulder 32 of the hub member 18. Attaching screws 33 extend through the flange 31 for securing the same to the hub member 18.

The energizing coil means 12 is suitably associated with the pole means 11 for producing the desired magnetic field and is here shown as being an annular coil 34 located in an annular recess 35 of the pole means. The coil 34 is energizable by current from a suitable source supplied thereto through appropriate electrical connections which include terminal members 36 and an associated terminal box 37.

The pole means 11 is provided with suitable friction lining 39 which is here shown as being ring-shaped and having its radially opposite outer and inner peripheral annular edges received in annular recesses 41 and 42 of the pole faces 29 and 30. The friction lining 39 is engageable by the armature means 13 upon movement of the latter to its coupled or closed position against the pole means 11 in response to energization of the coil 34 and, when wear of the friction lining and the adjacent pole faces 29 and 30 occurs and results in a variation in the width of the air gap 15, an automatic adjustment of such air gap is achieved by the action of the gap adjusting means 16 as will be explained in detail hereinafter.

The armature means 13 is here shown as comprising a disk member 44 suitably secured on a hub ring 45 and carrying a magnetically responsive flat rim portion 46 extending radially across the friction lining 39 and overlapping the pole faces 29 and 30. To provide for the axial shifting of the armature means 13 while rotatably connected with the shaft 24, the hub ring 45 and the hub member 22 are provided with cooperating splines 47.

The gap adjusting means 16 is effective between the armature means 13 and the hub member 22 and is located in an internal annular recess 50 provided in the ring 45 and extending around the hub member 22. The gap adjusting means 16 comprises a ring member 51, sometimes referred to herein as a first ring member, mounted on the hub member 22 by an axially adjustable gripping engagement therewith. As will be explained hereinafter, the ring member 51 preferably serves as an abutment means for limiting the axial shifting of the coupling member 13 in the opening direction, and the adjustable gripping engagement with the hub member 22 provides for adjustment of the width of the air gap 15. The gap adjusting means preferably also comprises at least one additional ring member 52 in an axially adjacent relation to the ring member 51, and spring means 53 associated with such ring member or members. The ring member 52 is, at times, referred to as a second ring member.

Figures 5, 6, 7:
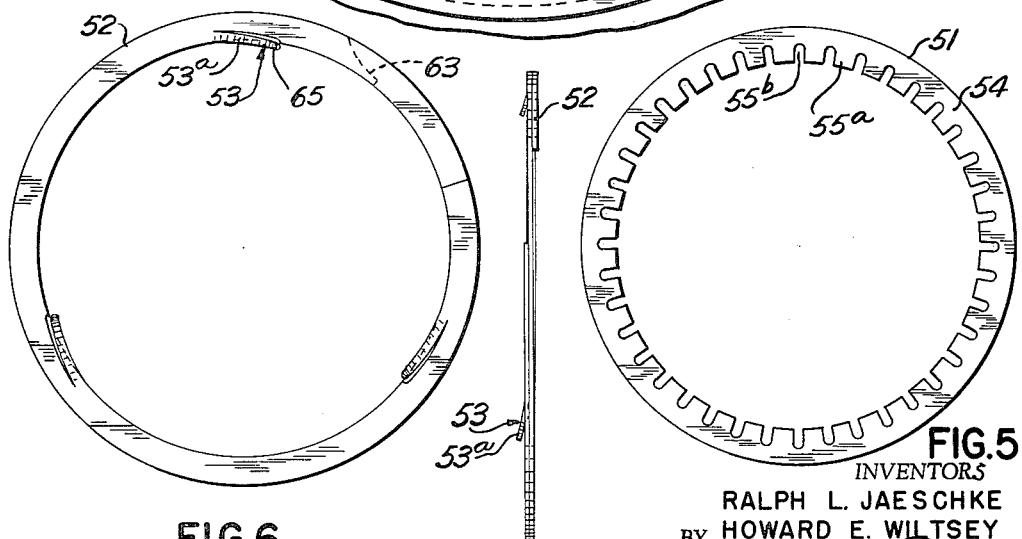
FIG. 5 is a plan view showing, in detached relation, a ring member of the gap adjusting means.
FIG. 6 is a plan view showing, in detached relation, another ring member of the gap adjusting means.
FIG. 7 is an edge view of the ring member of FIG. 6.

The ring member 51 comprises an annularly continuous outer rim portion 54 as the abutment means for the armature means 13, and a serrated inner annular portion 55 as a gripping portion for the gripping engagement with the hub member 22. As shown in FIG. 5, the serrated gripping portion 55 comprises an annular series of teeth $55^a$ separated by intervening radially disposed recesses $55^b$.

The ring member 51 is mounted on the hub member 22 by the gripping engagement of the gripping portion 55 therewith and, in its assembled position thereon, assumes an inclined position as shown in FIGS. 1 and 3 with the abutment portion 54 tilted toward the pole means 11. The ring member 51 is constructed of spring metal and is sufficiently resilient in character to permit the gripping portion 55 thereof to be slid axially onto the hub member 22 and to be adjustably shiftable therealong in a direction toward the pole means 11 for the automatic adjustment of the width of the air gap 15 when the above-mentioned wear on the pole means occurs. The functioning of the gap adjusting means 16 in causing the automatic adjustment of the air gap 15 will be further described hereinafter.

The diameter of the opening of the ring member 51 is somewhat less than the outer diameter of the hub member 22 so that when this ring member is pushed onto the hub member the serrated gripping portion 55 is flexed to the somewhat bowed condition shown in FIGS. 1, 3 and 4 The gripping engagement of the teeth $55^a$ on the hub member 22 is such that the ring member 51 will be strongly held against axial shifting along the hub member in a direction away from the pole means 11 to thereby enable this ring member to serve as the above-mentioned abutment means for the armature means 13 during movement of the latter to its uncoupled position. In thus serving as an abutment means, the abutment portion 54 of the ring member 51 projects into the annular recess 50 and is engageable by the inner end wall 58 during axial shifting of the armature means 13 in the uncoupling direction.

FIG. 3 of the drawings shows the end wall 58 in engagement with the abutment means 54 and represents the condition of the gap adjusting means 16 when the armature means 13 is in its uncoupled position as shown in FIG. 1. FIG. 4 of the drawings shows the condition of the gap adjusting means 16 when the armature means 13 has been shifted to its coupled position in engagement with the pole means 11 in response to energization of the coil 34 and at which time the inner end wall 58 of the recess 50 has moved away from the abutment portion 54 of the ring member 51.

When the portion 54 of the ring member 51 thus provides an abutment means engageable by the end wall 58, the spring means 53 remains in a flexed, and therefore partially loaded, condition when the armature means 13 has been fully shifted to its uncoupled position shown in FIGS. 1 and 3. This partially loaded condition of the spring means 53 at this time is desirable because it causes an assured movement of the armature means 13 to substantially the same air-gap spacing from the pole means 11 each time that the coil 34 is de-energized, and also prevents vibration and chattering of the armature means when it is in its uncoupled position.

The ring member 52 of the gap adjusting means 16 is here shown as being mounted on the armature means 13 by being engaged in an internal annular groove 60 of the hub ring 45. The ring member 52 thus forms, at least in part, an outer end wall for the recess 50 and against which the axial thrust of the spring means 53 can be applied. Since the ring member 52 is connected with the hub ring 45 and the thrust of the spring means 53 reacts against the ring member 52, the spring means will be effective as an armature retracting means for causing axial shifting of the armature means 13 to its uncoupled position shown in FIG. 1.

The ring member 52 is here shown as lying substantially in a transverse plane which is perpendicular to the rotation axis 17, and the abutment means 54 of the ring member 51 extends outwardly a sufficient distance into the annular recess 50 so as to lie between the two axially spaced walls formed by the inner end wall 58 and the ring member 52. The outer periphery of the ring member 51 is always spaced from the peripheral wall of the recess 50 so that this ring member is supported entirely by its gripping engagement with the hub member 22. The inclined relation of the ring member 51 is with respect to one of said axially spaced walls, in this case the wall formed by the ring member 52, and provides an annular crevice 61 therebetween in which the spring means 53 is located. The above-mentioned annular crevice 61 is of a radially outward diverging shape, as shown in FIG. 3, and varies in its axial width as shifting of the ring member 52 relative to the ring member 51 takes place.

The ring member 52 is here shown as being of the snap-ring type and as having a self-locking engagement in the groove 60 for connecting the same with the armature means 13. For achieving such self-locking engagement and for other purposes, the ring member 52 is made of spring metal and is here shown as being of flat-strip form and of a helical shape. The convolutions of the helix of the ring member 52 are substantially in face-to-face contact with each other and are here shown as comprising approximately two convolutions.

The resilient character of the ring member 52 causes the same to expand radially outward into the groove 60 when this ring member is inserted into the recess 50, and such self-expanding action of the ring member produces the self-locking engagement thereof in this groove. One end of the flat strip comprising the ring member 52 is here shown as having a suitably beveled portion 63 thereon for engagement by an appropriate tool for contracting this ring member when it is to be removed from the groove 60.

In the coupling means 10 as disclosed in FIGS. 1 to 7 inclusive, the spring means 53 is carried by the ring member 52 and comprises spring elements 53ª projecting therefrom into the annular crevice 61. The spring elements 53ª are of a finger-like shape and comprise segment portions partially sheared from the ring member 52 at spaced points around the inner periphery of the convolution thereof lying nearest the ring member 51. The spring elements 53ª are provided in suitable number and are spaced apart circumferentially around the ring member 52. The free ends 65 of the spring elements 53ª preferably all point in the same circumferential direction around the ring member 52 and press against the annularly continuous portion of the ring member 51 as shown in FIGS. 1 and 3.

When the magnetic pull on the armature means 13 is released by de-energization of the coil 34, the expansive action of the spring means 53 between the ring members 51 and 52 imparts a pushing force to the latter ring member whereby the armature means is retracted from the pole means 11 and shifted to its uncoupled position. The movement of the armature means 13 in the uncoupling direction brings the same into engagement with the abutment means 54 of the ring member 51 which remains stationary on the hub member 22 by reason of its strong gripping engagement therewith.

When the coil 34 is again energized, the armature means 13 is pulled into engagement with the pole means 11 thereby causing the ring member 52 to impart a flexure loading, or increased flexure loading, to the spring means 53. By the time that the armature means 13 has been shifted to its coupled position in engagement with the pole means 11, the spring means 53 will have been deflected to the condition represented in FIG. 4. Sufficient energy is thus stored in the spring means 53 to produce the above-described opening aixal shifting of the armature means 13 to its uncoupled position when the coil 34 is de-energized.

If wear on the pole means 11 or on the armature means 13 has occurred as referred to above, the movement of the armature means into engagement with the pole means upon energization of the coil 34 will result in an increased movement of the armature means in the coupling direction and a consequently greater flexure loading of the spring means 53. The gripping engagement of the gripping portion 55 of the ring member 51 with the hub member 22 is such that upon the occurrence of this greater flexure loading of the spring means 53, the holding action of the gripping means will be overcome and the ring member 51 will be slid along the hub member 22 until a balanced condition is achieved between the gripping action of the gripping means and the loading of the spring means. The sliding of the ring member 51 along the hub member 22 toward the pole means 11 in this manner is an adjusting movement by which the air gap 15 will be automatically adjusted and re-established at its desired normal width.

Figure 8:
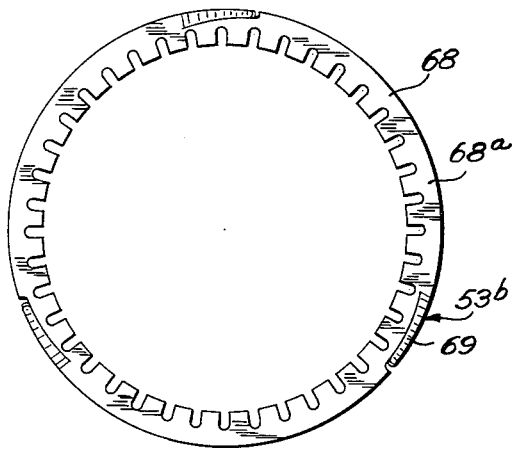
FIG. 8 is a plan view similar to FIG. 5 but showing a ring member of a construction providing a modified form of gap adjusting means.

In FIG. 8 of the drawings a ring member 68 is shown as representing another form of construction for the first ring member of the gap adjusting means 16. This modified construction of FIG 8 includes spring means 53ᵇ of the gap adjusting means which comprises finger-like spring elements 69 carried by the ring member 68. The spring elements 69 are similar to the above-described spring elements 53ª but comprise portions partially sheared from the annularly continuous rim portions 68ª of the ring member 68. The ring member 68 is intended to be use din the same relative position as the above-described ring member 51 of FIG. 1 and in association with transverse wall means, such as may be provided by a second ring member mounted on the armature means, as a reaction member for the spring means 53ᵇ. Since the spring elements 69 are provided on the first ring member 68, the associated second ring member can be a plain snap ring.

Figure 9:
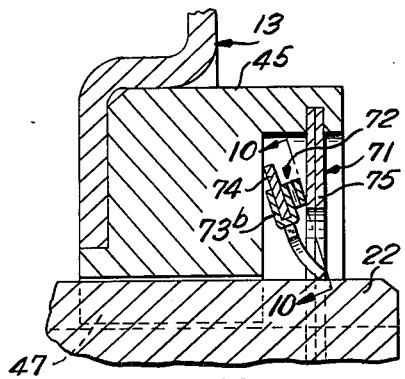
FIG. 9 is a fragmentary axial sectional view similar to that of FIG. 3 but showing another modified form of gap adjusting means.
Figure 10:
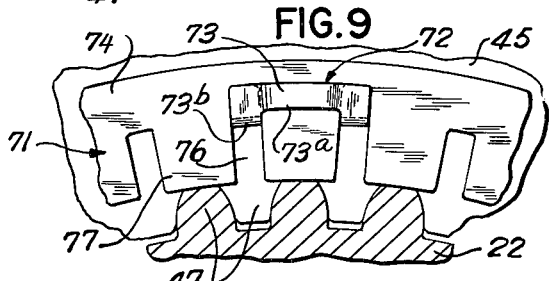
FIG. 10 is a fragmentary sectional view taken on section line 10—10 of FIG. 9.

FIGS. 9 and 10 of the drawings show a modified form of gap adjusting means 71 generally similar to the above-described gap adjusting means 16 but in which the spring means 72 comprises spring elements 73 mounted on the first ring member 74 so as to project from the side thereof facing toward wall means formed by the second ring member 75. The spring elements 73 each comprise a bowed segment 73ª and connecting lugs 73ᵇ at the ends of such bowed segment and bent into holding engagement with the first ring member 74. The lugs 73ᵇ are shown as being of a hook-like shape and as being engaged in the intervening recesses 76 which separate the teeth 77 forming the gripping portion of the first ring member 74.

Figure 11:
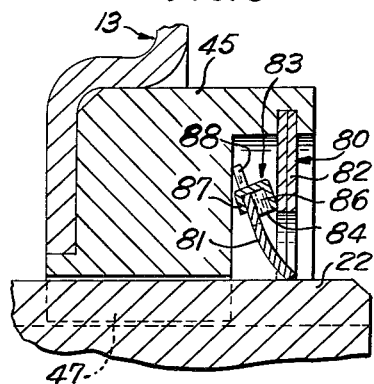
FIG. 11 is a sectional view similar to those of FIGS. 3 and 9 but showing a further modified form of gap adjusting means.
Figure 12:
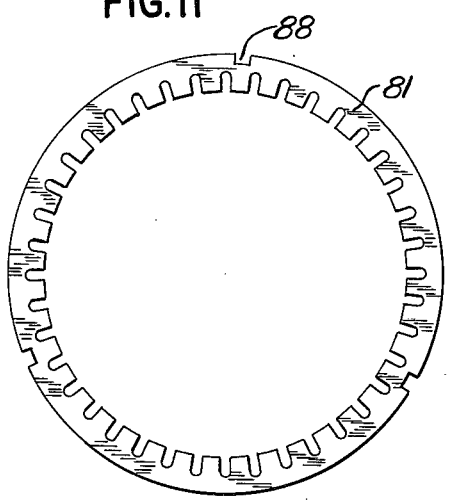
FIG. 12 is a plan view, in detached relation, showing another form of ring member usable in still another modified gap adjusting means.
Figure 13:
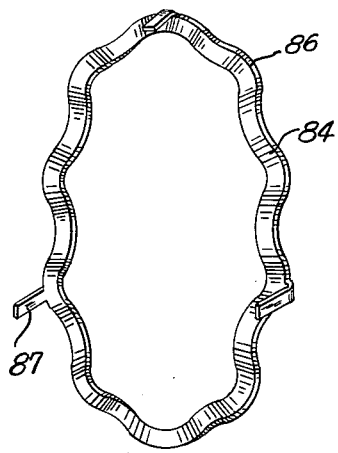
FIG. 13 is a perspective view showing, in detached relation, a ring-shaped spring means usable in the modified gap adjusting means which employs the ring member of FIG. 12.

FIG. 11 of the drawings shows another modified form of gap adjusting means 80 which is similar to the above-described gap adjusting means 16 and 71 in that it comprises first and second ring members 81 and 82 and a spring means 83, but the spring means thereof is in the form of the spring ring 84 shown in FIG. 13 which, in its assembled position, is carried by the first ring member 81. The spring ring 84 is of a wavy configuration circumferentially therearound so that curved segments thereof provide bowed spring elements 86 at annularly spaced points around the spring means 83.

The spring ring 84 is adapted to be suitably connected with the first ring member 81 and is shown in FIG. 13 as having axially extending lugs 87 at a plurality of spaced points therearound which are received in correspondingly spaced peripheral recesses or notches 88 of the ring member 81. The connecting lugs 87 are retained in the recesses 88 by being bent to the hookline form shown in FIG. 11 whereby the spring ring 84 is maintained in connected relation with the ring member 81.

The above-described modified constructions shown in FIGS. 9, 11 and 13 for the gap adjusting means all function in the manner already described above for the gap adjusting means 16 of FIG. 1 for controlling the width of the air gap 15 and automatically adjusting the same, or re-establishing the same, at its normal width when wear of the pole means 11 or armature means 13 has occurred.

Figure 14:
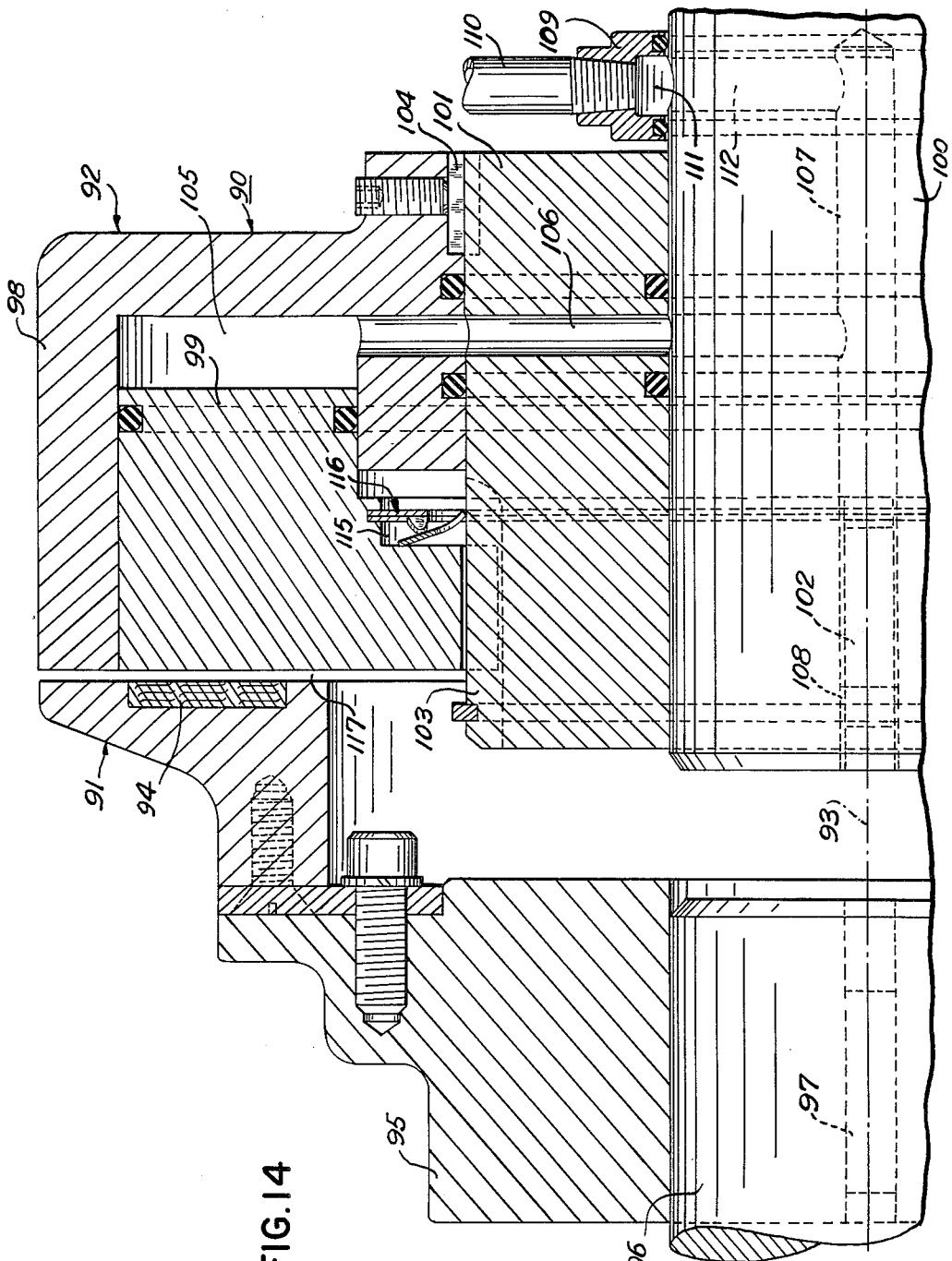
FIG. 14 is a fragmentary axial section taken through still another modified form of the novel coupling device wherein the axially shiftable coupling member is actuable by fluid pressure responsive means.

FIG. 14 of the drawings shows another modified coupling device 90 applicable to clutch or brake use and comprising first and second coupling members 91 and 92 disposed on a common axis 93. The coupling member 91 is provided with a friction lining 94 and is here shown as being of an annular shape and having a hub portion 95 secured on a shaft member 96 as by a key 97.

The second coupling member 92 comprises cooperating annular cylinder and piston members 98 and 99 connected with a rotatable shaft 100 by being mounted on a hub member 101 which is secured on such shaft as by a key 102. The hub member 101 is provided with an externally splined portion 103 whose splines extend along this member for only a portion of its length.

The cylinder member 98 is in a surrounding relation to unsplined portion of the hub member 101 and is connected for rotation therewith as by a suitable key 104. The piston member 99 co-operates with the cylinder member 98 to define therebetween an annular cylinder chamber 105 and is provided with an internal annular series of spline teeth by which the piston member is connected with the splined portion 103 of the hub 101 for rotation with the latter.

The piston member 99 is axially shiftable in the cylinder chamber 105 and along the splined portion 103 of the hub member 101 in a direction toward the coupling member 91 for producing a coupled engagement with the latter. This shifting of the piston member in its closing direction is produced by suitable pressure fluid supplied to the cylinder chamber 105 through a radial passage 106 which connects the cylinder chamber with a central axial passage 107 of the shaft 100.

The passages 107 is closed at the inner end of the shaft 100 as by means of a suitable plug 108. Pressure fluid is supplied to, and exhausted from, the cylinder chamber 105 through the passages 106 and 107 and through a grooved stationary ring 109 surrounding the shaft 100 and having a fluid supply conduit 110 extending thereto. The groove 111 of the ring 109 is in continuous communication with the axial passage 107 of the shaft 100 through a radial passage 112 of the latter.

The piston member 99 is provided with an axially facing annular recess 115 which extends around the hub member 101 and corresponds with the annular recess 50 of FIG. 1. The piston member 99 is also provided with gap-adjusting means 116 for maintaining or restoring the desired normal width of the air gap 117 and is located in the recess 115. The gap adjusting means 116 is of the same construction and functions in the same manner as has been described in detail above for the gap-adjusting means 16 of FIGS. 1, 3 and 4.

During clutch use of the coupling device 90 both of the coupling members 91 and 92 are rotatable on the axis 93 and either of the shafts 96 and 100 can be the power input member. When the coupling device 90 is used as a brake the coupling member 91 is stationary, that is, nonrotatable.

Figure 15:
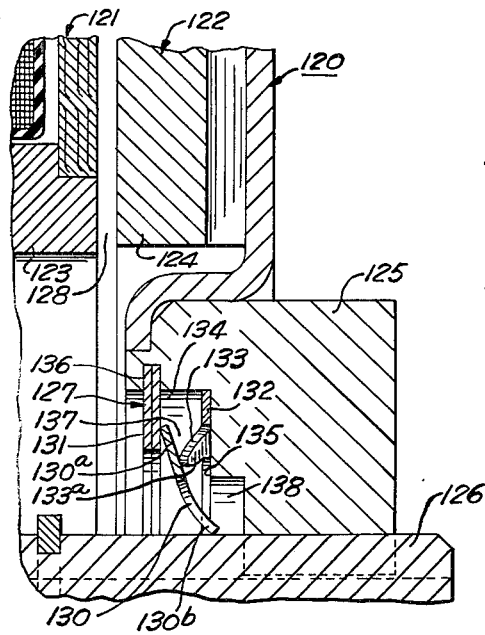
FIG. 15 is a fragmentary axial section taken through a further modified form of the novel coupling device wherein the gap adjusting means is located on the adjacent side of the axially shiftable coupling member, the device being shown with the shiftable coupling member in its uncoupled or open position.
Figure 16:
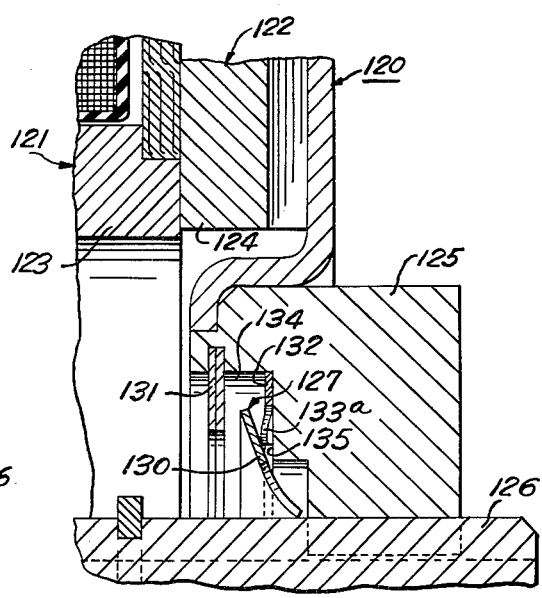
FIG. 16 is a fragmentary axial section showing the modified coupling device of FIG. 15 in its closed or engaged condition.

FIGS. 15 and 16 of the drawings show a further modified form of coupling device 120 comprising relatively rotatable coupling members 121 and 122 which, in this case, comprise an annular pole means 123 and an annular armature means 124. The armature means 124 includes a hub member 125 rotatable with and axially shiftable on a support member 126.

The modified coupling device 120 also comprises gap adjusting means 127 for automatically adjusting the width of the air gap 128 between the pole means 123 and armature means 124. FIG. 15 shows the coupling device 120 with the armature means 124 in its disengaged or open position. FIG. 16 shows the same coupling device with the armature means 124 in its closed or engaged position.

The gap adjusting means 127 is located on the side of the armature means 124 nearest the pole means 123 and comprises a plurality of ring members, in this case three such ring members 130, 131 and 132. The gap adjusting means 127 also comprises a spring means 133 associated with these ring members.

The hub member 125 is provided with an internal annular recess 134 extending around the support member 126 and which recess has axially spaced annular end walls formed, respectively, by the ring member 131 and an inner end wall means 135 on the hub member 125. The ring member 131 is mounted on the hub member 125 and is connected therewith by being engaged in an internal annular groove 136 thereof. The ring member 131 is here shown as being of a form comparable with that described above for the ring members 71 and 80 of FIGS. 9 and 11.

The ring member 130 is mounted on the support member 126 by a gripping engagement of a serrated portion 130$^b$ therewith and is of a form comparable with that described above for the ring member 51 shown in FIGS. 1, 2 and 5. The ring member 130 extends outwardly into the recess 134 so as to lie between the end walls thereof and is in an inclined relation to one of such walls, in this case the inner wall means 135, so as to define therewith an intervening radially divergent annular crevice 137. The annularly continuous outer portion of the ring member 130 forms an abutment means 130$^a$ which is engageable by the ring member 131, as shown in FIG. 15, when the armature means 124 is in its open position.

The spring means 133 comprises an annual group of spring elements 133$^a$ located in the annular crevice 137 and engaging the annularly continuous portion of the ring member 130. The spring elements 133$^a$ are of a form and distribution comparable with the spring elements 53$^a$ of the ring member 52 shown in FIGS. 6 and 7 but, in this case, are carried by the third ring member 132. The third ring member 132 lies against the end wall means 135 with the spring elements 133 projecting from the third ring member into the annular crevice 137. The end wall means 135 is provided with an annular clearance notch 138 to accommodate a portion of the ring member 130. particularly when the armature means 124 is shifted to its closed postion as shown in FIG. 16.

The gap adjusting means 127 functions in substantially the same manner and for the same purpose as the gap adjusting means 16, 72, 83 and 116 described above. During this functioning the spring means 133 serves the dual purpose of shifting the armature means 124 to its open position shown in FIG. 15 and applying thrust to the ring member 130 in response to predetermined loading of the spring means. Such thrust applied to the ring member 130 imparts an axial gap-adjusting sliding movement thereto along the support member 126.

Figure 17:
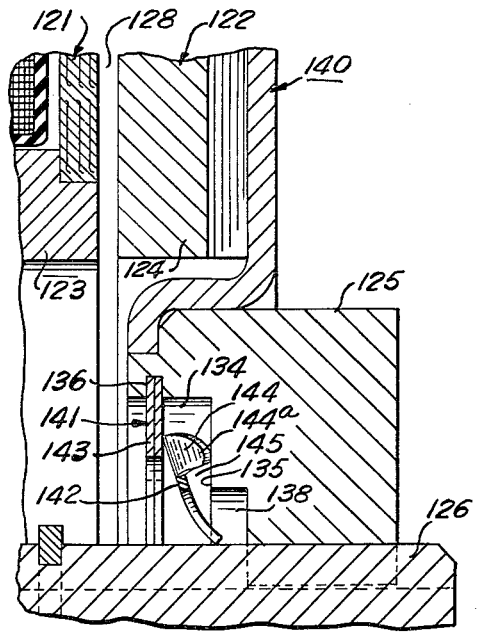
FIG. 17 is a fragmentary axial section taken through still another modified form of the novel coupling device wherein the gap adjusting means is located on the adjacent side of the axially shiftable coupling member, the device being shown in its open condition.
Figure 18:
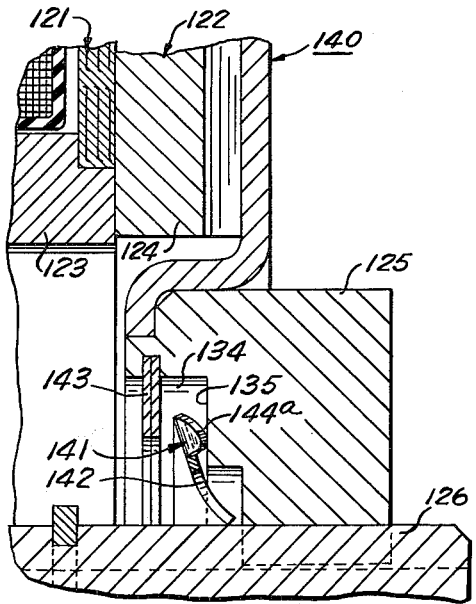
FIG. 18 is a fragmentary axial section showing the modified coupling device of FIG. 17 in its closed or engaged condition.

FIGS. 17 and 18 show still another modified form of coupling device 140 which is generally similar to the coupling device 120 of FIGS. 15 and 16 but in which a gap adjusting means 141 of a more simplified form is provided. Various components of the coupling device 140 are the same as in the coupling device 120 and have been designated by the same reference numerals.

The gap adjusting means 141 is comprised of two ring members 142 and 143 and an associated spring means 144. The ring member 143 has the same form, location and manner of mounting as the ring member 131 of FIG. 15 and the ring member 142 is of a form comparable to the ring member 68 of FIG. 8. The ring member 142 occupies a position generally similar to that of the ring member 130 of FIG. 15 so as to co-operate with the inner annular end wall 135 in defining an intervening radially divergent annular crevice 145. The spring means 144 comprises a group of spring elements 144a comparable with the spring elements 69 of the ring member 68 and which extend into the annular crevice 145 and engage the wall means 135.

The gap adjusting means 141 functions in substantially the same manner and for the same purpose as has already been described above for the gap adjusting means 16, 71, 83, 116 and 127.

From the accompanying drawings and the foregoing detailed description it will now be readily understood that this invention provides a novel coupling usable either as a clutch or a brake and which is of a highly practical form. It will now also be understood that the gap adjusting means provided by this invention for such coupling device is of a simple form requiring only a minimum number of parts capable of being readily assembled, and that the gap adjusting means will operate in a satisfactory and reliable manner for automatically adjusting the air gap in accordance with the needs of the coupling device when wear has occurred on one or both of the co-operating coupling members.

Although the coupling device of this invention and the gap adjusting means thereof have been illustrated and described herein to a somewhat detailed extent, it will be understood, of course, that the invention is not to be regarded as being limited correspondingly in scope but includes all changes and modifications coming within the terms of the claims hereof.

Having described our invention, we claim:

1. In a coupling device of the character described; a pair of first and second coupling members relatively rotatable on a common axis and one of which is also shiftable along said axis between a coupled position in engagement with the other coupling member and an uncoupled position spaced therefrom by an intervening air gap; support means for said one coupling member and supporting the same for the axial shifting thereof to said coupled and uncoupled positions; said one coupling member having annual wall means surrounding said axis and extending in a transverse relation thereto; power means operable to cause the axial shifting of said one coupling member to said coupled position; and means for automatic adjustment of said gap comprising a plurality of ring members surrounding said axis and support means, and an associated spring means; said spring means being subject to loading during shifting of said one coupling member to its coupled position by said power means and being expansively effective to shift said one coupling member to its uncoupled position upon release of said power means; one of said ring members being mounted on said one coupling member in a spaced relation to said wall means, and another of said ring members being mounted on said support means and having a portion thereof projecting into the space between said one ring member and said wall means; the second-mentioned ring member having gripping means in gripping engagement with said support means and adjustably axially slidable therealong in a direction toward said second coupling member in response to a predetermined extent of loading of said spring means; the ring portion projecting into said space comprising an abutment means for limiting the shifting of said one coupling member toward its uncoupled position by the expansion action of said spring means.

2. In a coupling device of the character described; a first annular coupling member; a rotatable support means; a second annular coupling member mounted on said support means for rotation therewith and being axially shiftable thereon between a coupled position in engagement with said first coupling member and an uncoupled position spaced from said first coupling member by an air gap; power means effective to cause the axial shifting of said second coupling member to said coupled position; said second coupling member having axially spaced first and second annular walls and an intervening annular space between said walls and extending around said support means; a first ring member having a gripping means and being mounted on said support means by a gripping engagement of said gripping means therewith; said gripping engagement being effective to resist sliding of said first ring member on said support means in a direction away from said first coupling member while permitting sliding thereof in a direction toward said first coupling member for adjustment of said gap; one of said walls comprising a second ring member connected with said second coupling member; said first ring member projecting into said space in a relatively inclined relation to one of said walls and defining therewith a divergent annular crevice; and spring means in said crevice and effective between said first ring member and the last-mentioned one wall for causing the axial shifting of said second coupling member toward said uncoupled position, and also effective to transmit thrust to said first ring member to cause the gap-adjusting sliding thereof on said support means.

3. A coupling device as defined in claim 2 wherein the gripping means of said first ring member comprises a serrated portion thereof.

4. A coupling device as defined in claim 2 wherein said spring means comprises spring elements carried by one of said ring elements and supported thereby in a circumferentially spaced and circumferentially extending relation in said crevice.

5. A coupling device as defined in claim 2 wherein said spring means comprises flexible finger elements projecting into said crevice from one of said ring members and spaced apart circumferentially around said crevice.

6. A coupling device as defined in claim 2 wherein said spring means comprises spring elements carried by said first ring member and spaced circumferentially around said crevice.

7. A coupling device as defined in claim 2 wherein said first ring member has tooth projections on the inner periphery thereof for producing said gripping engagement; said spring means comprising flexible fingers formed by circumferentially spaced outer peripheral portions of said first ring member and projecting therefrom into said crevice.

8. A coupling device according to claim 2 wherein said one coupling has an internal annual groove therein and said second ring member is of the snap-ring type and has a self-expanding engagement in said groove and is of a helical shape and is comprised of radially edgewise disposed flat-strip convolutions.

9. In a coupling device of the character described; a pair of first and second relatively rotatable coupling members; rotatable support means having one of said coupling members mounted thereon for rotation therewith and for axial shifting thereon between coupled and uncoupled positions relative to the other of said coupling members, and said one coupling member in the uncoupled position being spaced from said other coupling member by an intervening air gap; power means effective to cause the axial shifting of said one coupling member to said coupled positions; said one coupling member having an annular recess extending axially thereinto in surrounding relation to said support means, and also having end wall means at the inner end of said recess and an internal annular groove adjacent the outer end of said recess; and a plurality of ring members and an associated spring means all located in said recess; said spring means being subject to loading by shifting of said one coupling member to its coupled position and being expansively effective to shift said one coupling member to its uncoupled position upon release of said power means; one of said ring members being engaged in said groove; another of said ring members comprising a gripping means and being mounted on said support means by a gripping engagement of said gripping means therewith; the second-mentioned ring member also comprising an abutment means disposed between said one ring member and said end wall means for limiting the axial shifting of said one coupling member in the uncoupling direction by the expansive action of said spring means; the gripping engagement of said second-mentioned ring member with said support means being effective to resist shifting of said second-mentioned ring member axially therealong in said uncoupling direction while permitting shifting therealong in the opposite direction for an automatic adjustment of said gap; and a third ring member engaged with said end wall means; said spring means comprising spring elements carried by said third ring member.

10. In an electromagnetic coupling device, a pair of first and second relatively rotatable coupling members; said first coupling member including an annular pole means; field coil means associated with said pole means; said second coupling member including a support means and an armature means connected therewith and axially shiftable thereon between a coupled position in engagement with said pole means and an uncoupled position spaced from said pole means by an air gap; a first ring member mounted on said support means by a gripping and axially slidable adjusting engagement therewith which resists sliding of said first ring member in a direction away from said first coupling member while permitting sliding thereof in a direction toward said first coupling member for adjustment of said air gap; a second ring member connected with said armature means; said first and second ring members being in a relatively inclined relation so as to define a divergent annular crevice therebetween; spring means in said crevice and effective between said ring members for causing the axial shifting of said armature means toward said uncoupled position and also effective to transmit thrust to said first ring member to cause the gap-adjusting sliding thereof on said support means; said spring means comprising spring elements spaced circumferentially around said crevice; and connecting means comprising hook-shaped portions connecting said spring elements with said first ring member.

11. In an electromagnetic coupling device, a pair of first and second relatively rotatable coupling members; said first coupling member including an annular pole means; field coil means associated with said pole means; said second coupling member including a support means and an armature means connected therewith and axially shiftable thereon between a coupled position in engagement with said pole means and an uncoupled position spaced from said pole means by an air gap; a first ring member mounted on said support means by a gripping and axially slidable adjusting engagement therewith which resists sliding of said first ring member in a direction away from said first coupling member while permitting sliding thereof in a direction toward said first coupling member for adjustment of said air gap; a second ring member connected with said armature means; said first and second ring members being in a relatively inclined relation so as to define a divergent annular crevice therebetween; spring means in said crevice and effective between said ring members for causing the axial shifting of said armature means toward said uncoupled position and also effective to transmit thrust to said first ring member to cause the gap-adjusting sliding thereof on said support means; said spring means comprising bowed segments; and connecting means comprising lug means associated with said segments and engaged with said first ring member.

12. In an electromagnetic coupling device, a pair of first and second relatively rotatable coupling members; said first coupling member including an annular pole means; field coil means associated with some said pole means; said second coupling member including a support means and an armature means connected therewith and axially shiftable thereon between a coupled position in engagement with said pole means and an uncoupled position spaced from said pole means by an air gap; a first ring member mounted on said support means by a gripping and axially slidable adjusting engagement therewith which resists sliding of said first ring member in a direction away from said first coupling member while permitting sliding thereof in a direction toward said first coupling member for adjustment of said air gap; a second ring member connected with said armature means; said first and second ring members being in a relatively inclined relation so as to define a divergent annular crevice therebetween; and spring means in said crevice and effective between said ring members for causing the axial shifting of said armature means toward said uncoupled position, and also effective to transmit thrust to said first ring member to cause the gap-adjusting sliding thereof on said support means; and said first ring member has circumferentially spaced recesses therein; and connecting means comprising lug projections on said spring means and engaged in said recesses.

13. In an electromagnetic coupling device, a pair of first and second relatively rotatable coupling members; said first coupling member including an annular pole means; field coil means associated with said pole means; said second coupling member including a support means and an armature means connected therewith an axially shiftable thereon between a coupled position in engagement with said pole means and an uncoupled position spaced from said pole means by an air gap; a first ring member mounted on said support means by a gripping and axially slidable adjusting engagement therewith which resists sliding of said first ring member in a direction away from said first coupling member while permitting sliding thereof in a direction toward said first coupling member for adjustment of said air gap; a second ring member connected with said armature means; said first and second ring members being in a relatively inclined relation so as to define a divergent annular crevice therebetween; and spring means in said crevice and effective between said ring members for causing the axial shifting of said armature means toward said uncoupled position, and also effective to transmit thrust to said first ring member to cause the gap-adjusting sliding thereof on said support means; and said first ring member has tooth projections on the inner periphery thereof for producing said gripping engagement and separated by intervening recesses; and connecting means comprising lug projections on said spring means and engaged in said recesses.

References Cited by the Examiner
UNITED STATES PATENTS 2,965,207 12/1960 Synder.
2,970,681 2/1961 Timmcke.
2,973,850 3/1961 Jaeschke.

DON A. WAITE, *Primary Examiner.*
FRANK SUSKO, DAVID J. WILLIAMOWSKY,
*Examiners.*